United States Patent
Hatada

(10) Patent No.: US 11,782,251 B2
(45) Date of Patent: *Oct. 10, 2023

(54) ZOOM LENS AND IMAGING APPARATUS HAVING THE SAME

(71) Applicant: CANON KABUSHIKI KAISHA, Tokyo (JP)

(72) Inventor: Takahiro Hatada, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/585,943

(22) Filed: Jan. 27, 2022

(65) Prior Publication Data

US 2022/0146801 A1 May 12, 2022

Related U.S. Application Data

(63) Continuation of application No. 16/836,127, filed on Mar. 31, 2020, now Pat. No. 11,269,165.

(30) Foreign Application Priority Data

Apr. 4, 2019 (JP) .................... 2019-071892

(51) Int. Cl.
*G02B 15/14* (2006.01)
(52) U.S. Cl.
CPC ............. *G02B 15/144113* (2019.08); *G02B 15/143105* (2019.08)
(58) Field of Classification Search
CPC .... G02B 15/144113; G02B 15/145121; G02B 15/145129
See application file for complete search history.

(56) References Cited

U.S. PATENT DOCUMENTS

| 7,532,410 | B2 | 5/2009 | Kawana |
| 9,036,265 | B2 | 5/2015 | Hatada |

(Continued)

FOREIGN PATENT DOCUMENTS

| CN | 101329443 A | 12/2008 |
| JP | 2007-256452 A | 10/2007 |
| JP | 2007-286492 A | 11/2007 |
| JP | 2014098743 A | 5/2014 |

(Continued)

OTHER PUBLICATIONS

Extended European Search Report issued by the European Patent Office dated Jul. 27, 2020 in corresponding EP Application No. 20167255.7-1020.

(Continued)

*Primary Examiner* — Darryl J Collins
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, and a subsequent unit having a positive refractive power as a whole. A distance between adjacent lens units changes during zooming. The first lens unit includes a single lens, and the subsequent unit includes a third lens unit having a positive refractive power closest to the object side in the subsequent unit and a lens unit LP having a positive refractive power closest to the image side among the zoom lenses. During zooming from a wide-angle end to a telephoto end, the second lens unit moves toward the object side. A predetermined condition is satisfied.

15 Claims, 8 Drawing Sheets

(56) References Cited

U.S. PATENT DOCUMENTS

| | | |
|---|---|---|
| 9,684,155 B2 | 6/2017 | Hatada |
| 10,120,170 B2 | 11/2018 | Tatada |
| 10,895,722 B2 | 1/2021 | Hatada |
| 11,269,165 B2* | 3/2022 | Hatada ............ G02B 15/144113 |
| 2002/0063969 A1* | 5/2002 | Hamano ............ G02B 27/0037 |
| | | 359/686 |
| 2003/0202254 A1 | 10/2003 | Kanai |
| 2004/0056969 A1* | 3/2004 | Hamano ........ G02B 15/144113 |
| | | 348/240.3 |
| 2005/0237626 A1 | 10/2005 | Park |
| 2011/0134540 A1 | 6/2011 | Kim |
| 2013/0235468 A1* | 9/2013 | Yanai ................... G02B 15/173 |
| | | 359/687 |
| 2018/0348481 A1 | 12/2018 | Iwamoto |
| 2019/0004295 A1 | 1/2019 | Hatada |
| 2020/0132974 A1 | 4/2020 | Kimura et al. |
| 2020/0257095 A1 | 8/2020 | Kimura et al. |

FOREIGN PATENT DOCUMENTS

| | | |
|---|---|---|
| JP | 2014-149428 A | 8/2014 |
| JP | 2016045491 A | 4/2016 |
| JP | 2017125884 A | 7/2017 |
| JP | 2017156428 A | 9/2017 |
| WO | 2010/029736 A1 | 3/2010 |
| WO | 2014129187 A1 | 8/2014 |

OTHER PUBLICATIONS

Notification of the First Office Action issued by the China National Intellectual Property Administration dated Nov. 3, 2021 in corresponding CN Patent Application No. 202010240638.8, with English translation.

Notice of Reasons for Rejection issued in corresponding JP Patent Application No. 2019-071892, dated Oct. 4, 2022, pp. 1-7, together with English translation.

* cited by examiner

ZOOM LENS AND IMAGING APPARATUS HAVING THE SAME

CROSS REFERENCE TO RELATED APPLICATIONS

This application is a continuation of U.S. patent application Ser. No. 16/836,127, filed on Mar. 31, 2020, which claims the benefit of and priority to Japanese Patent Application No. 2019-071892, filed Apr. 4, 2019, each of which is hereby incorporated by reference herein in their entirety.

BACKGROUND OF THE INVENTION

Field of the Invention

The present invention relates to a zoom lens and an imaging apparatus having the same, and is suitable for an imaging apparatus having an image sensor, such as a video camera, an electronic still camera, a broadcasting camera, and a surveillance camera.

Description of the Related Art

Japanese Patent Laid-Open No. ("JP") 2017-156428 discloses a five-unit zoom lens including positive, negative, positive, negative, and positive lenses. The zoom lens disclosed in JP 2017-156428 realizes high imaging performance over the entire zoom range by increasing the number of movable lens units during zooming to increase the freedom degree of the aberration correction. In addition, the zoom lens is made lightweight by including only one or two lenses in the first lens unit. JP 2016-45491 discloses a six-unit zoom lens including positive, negative, positive, positive, positive, and positive lenses. In the zoom lens disclosed in JP 2016-45491, the first lens unit includes only one lens and thus the zoom lens is made lightweight.

However, the zoom lenses disclosed in JPs 2017-156428 and 2016-45491 have long overall optical lengths relative to the sensor size (image height) at the wide-angle end. Hence, these zoom lenses cannot be sufficiently made compact in the overall optical length direction.

SUMMARY OF THE INVENTION

The present invention provides a compact and lightweight zoom lens having high optical performance over the entire zoom range, and an imaging apparatus having the same.

A zoom lens according to one aspect of the present invention includes in order from an object side to an image side a first lens unit having a positive refractive power, a second lens unit having a negative refractive power, and a subsequent unit having a positive refractive power as a whole. A distance between adjacent lens units changes during zooming. The first lens unit consists of a single lens. The subsequent unit includes a third lens unit having a positive refractive power closest to the object side in the subsequent unit and a lens unit LP having a positive refractive power closest to the image side among the zoom lenses. During zooming from a wide-angle end to a telephoto end, the second lens unit moves toward the object side. The following conditional expressions are satisfied:

$$15.0 < vdLP < 30.0$$

$$0.50 < fLP/\text{ft} < 2.00$$

where $vdLP$ is an Abbe number of a material of a lens having the highest refractive power among the positive lenses included in the lens unit LP, ft is a focal length of the zoom lens at the telephoto end, and $fLP$ is a focal length of the lens unit LP.

An imaging apparatus having the zoom lens also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

A specific description will be given of each of zoom lenses 1a to 1e according to first to fifth embodiments as the zoom lenses according to the present invention.

Figure 1:
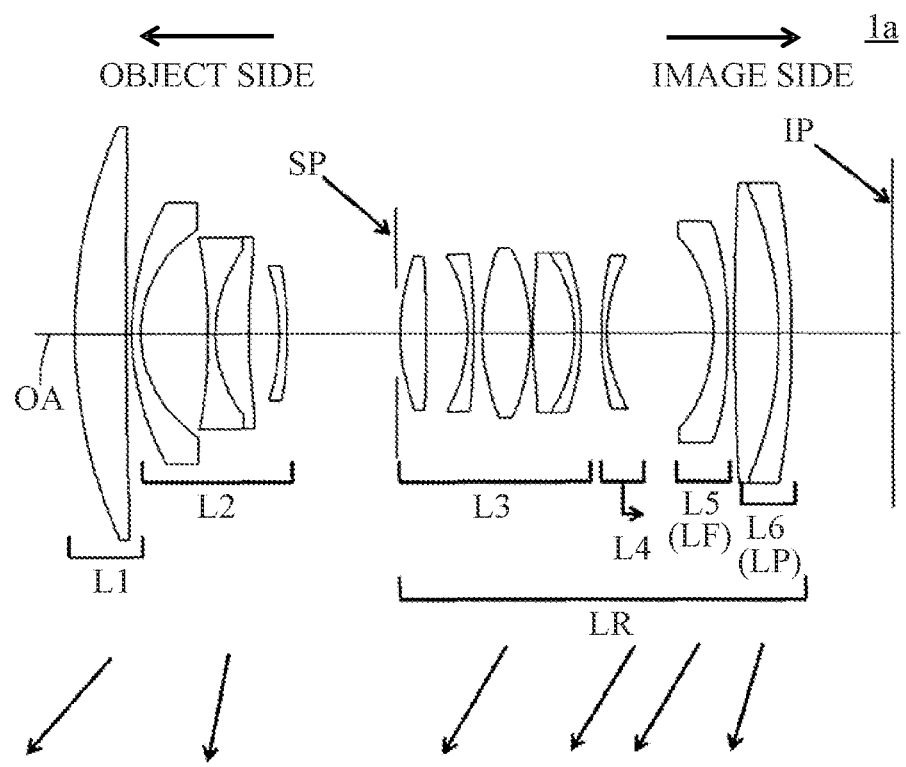
FIG. 1 is a lens sectional view of a zoom lens according to a first embodiment at a wide-angle end when an object at infinity is focused.
Figure 2:
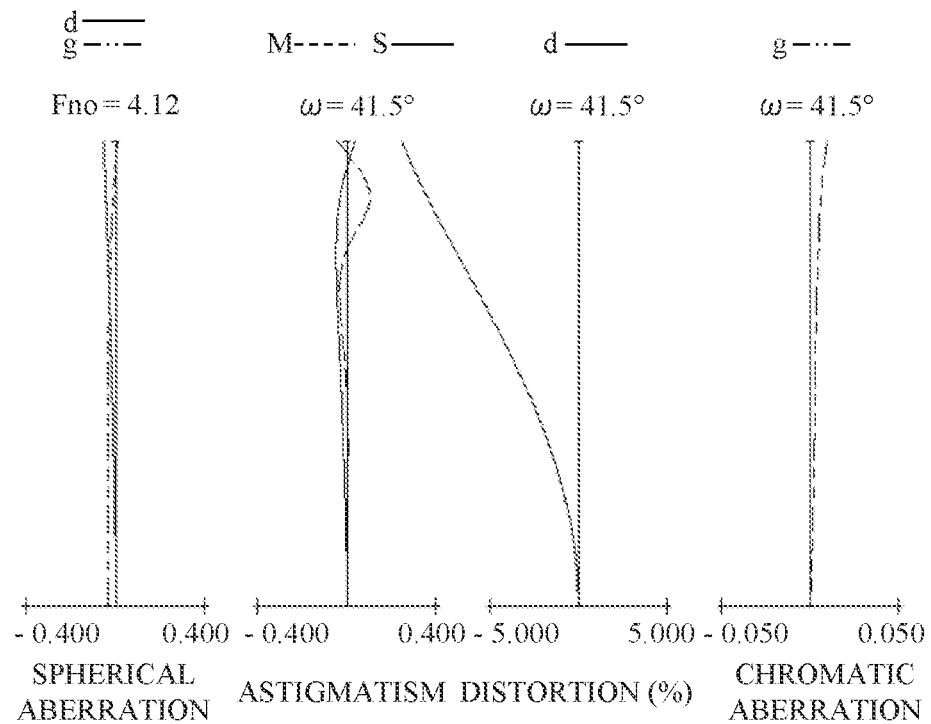
FIG. 2 is a longitudinal aberration diagram of the zoom lens according to the first embodiment at the wide-angle end when the object at infinity is focused.
Figure 3:
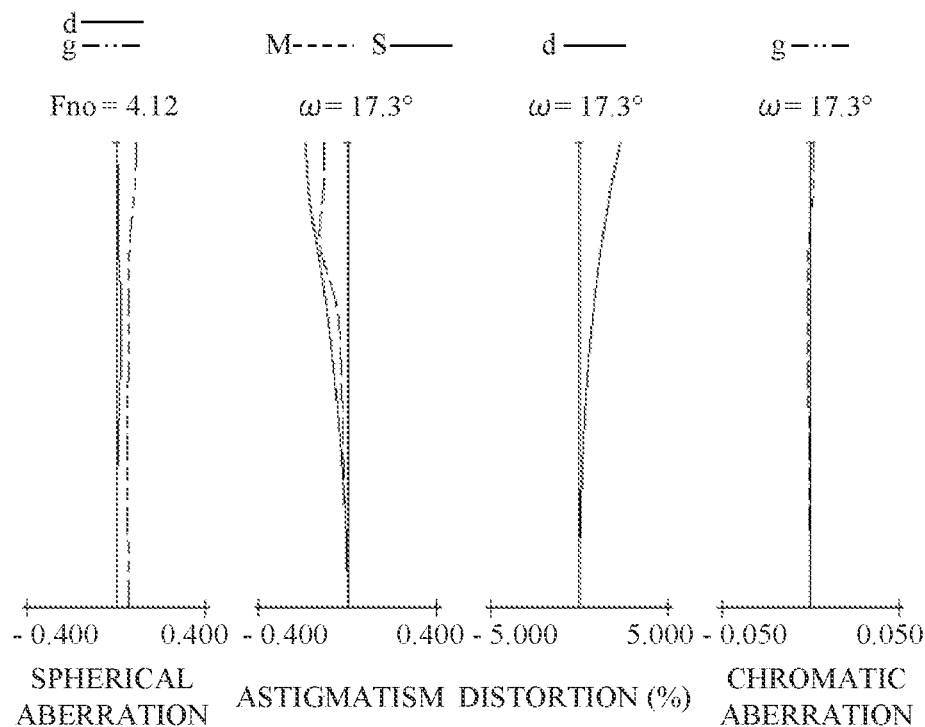
FIG. 3 is a longitudinal aberration diagram of the zoom lens according to the first embodiment at a telephoto end when the object at infinity is focused.

FIG. 1 is a sectional view of the zoom lens 1a according to a first embodiment of the present invention at the wide-angle end (short focal length end) when an object at infinity is focused. FIG. 2 is a longitudinal aberration diagram when the object at infinity is focused at the wide-angle end of the zoom lens 1a. FIG. 3 is a longitudinal aberration diagram when the object at infinity is focused at the telephoto end (long focal length end) of the zoom lens 1a.

Figure 4:
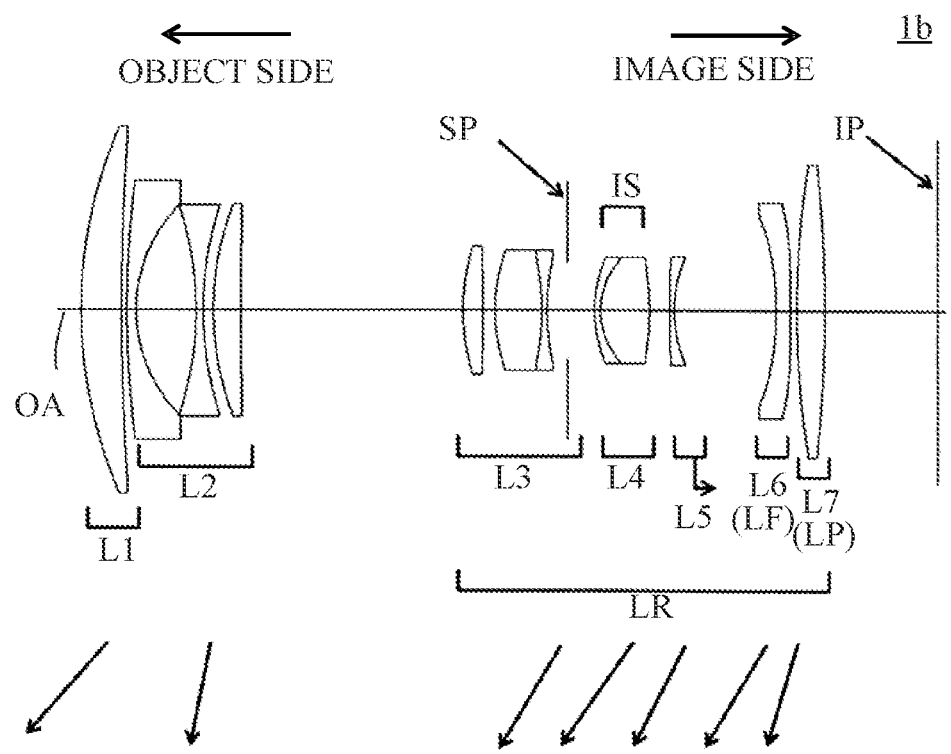
FIG. 4 is a lens sectional view of a zoom lens according to a second embodiment at a wide-angle end when an object at infinity is focused.
Figure 5:
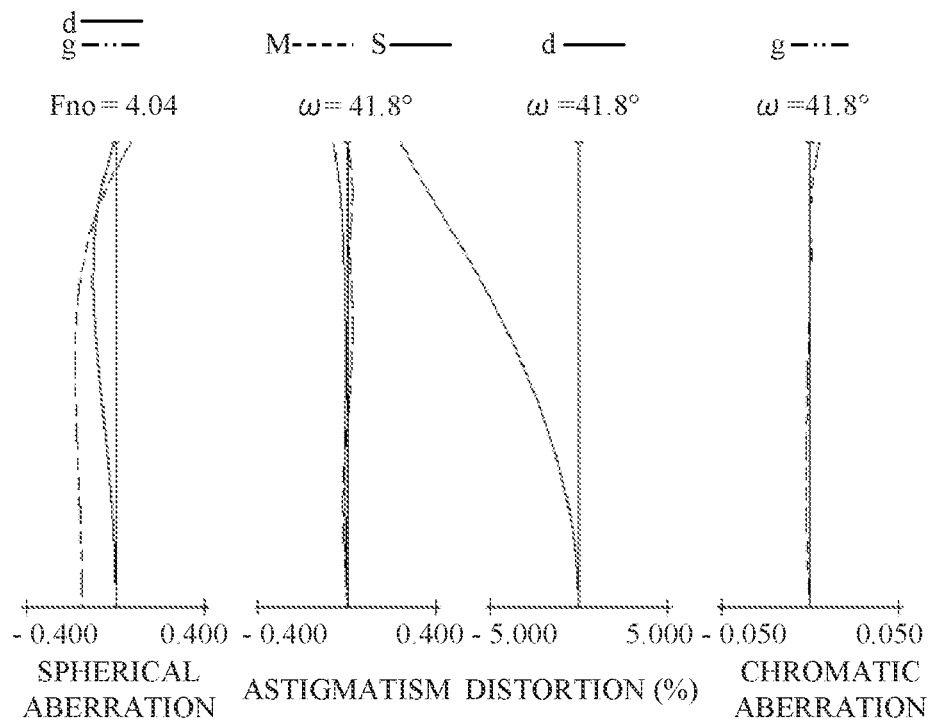
FIG. 5 is a longitudinal aberration diagram of the zoom lens according to the second embodiment at the wide-angle end when the object at infinity is focused.
Figure 6:
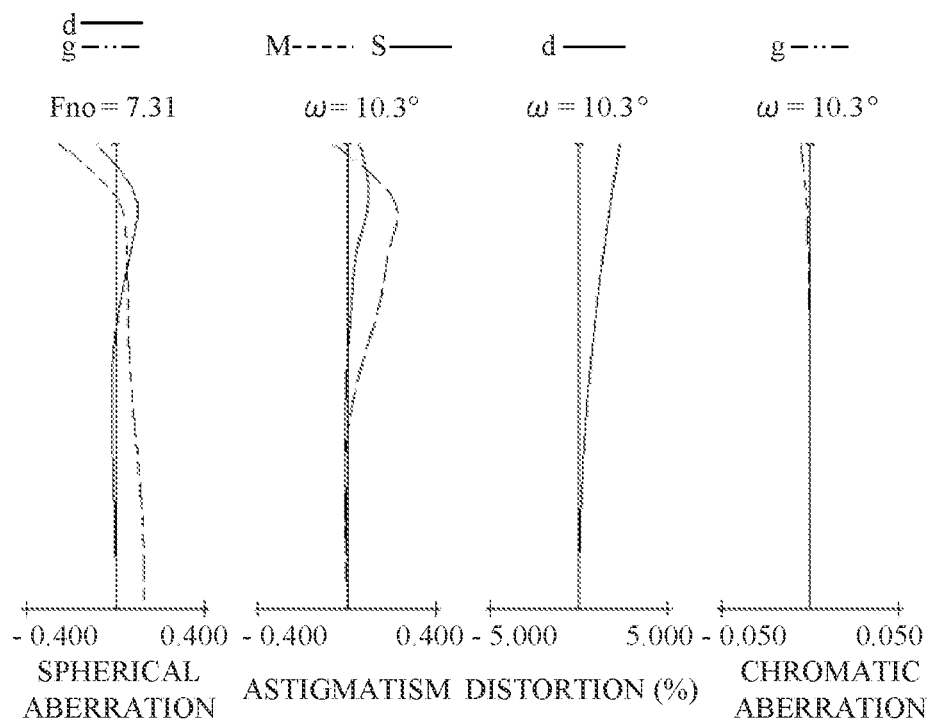
FIG. 6 is a longitudinal aberration diagram of the zoom lens according to the second embodiment at a telephoto end when the object at infinity is focused.

FIG. 4 is a sectional view of the zoom lens 1b according to a second embodiment of the present invention when the object at infinity is focused at the wide-angle end. FIG. 5 is a longitudinal aberration diagram when the object at infinity is focused at the wide-angle end of the zoom lens 1b. FIG. 6 is a longitudinal aberration diagram when the object at infinity is focused at the telephoto end of the zoom lens 1b.

Figure 7:
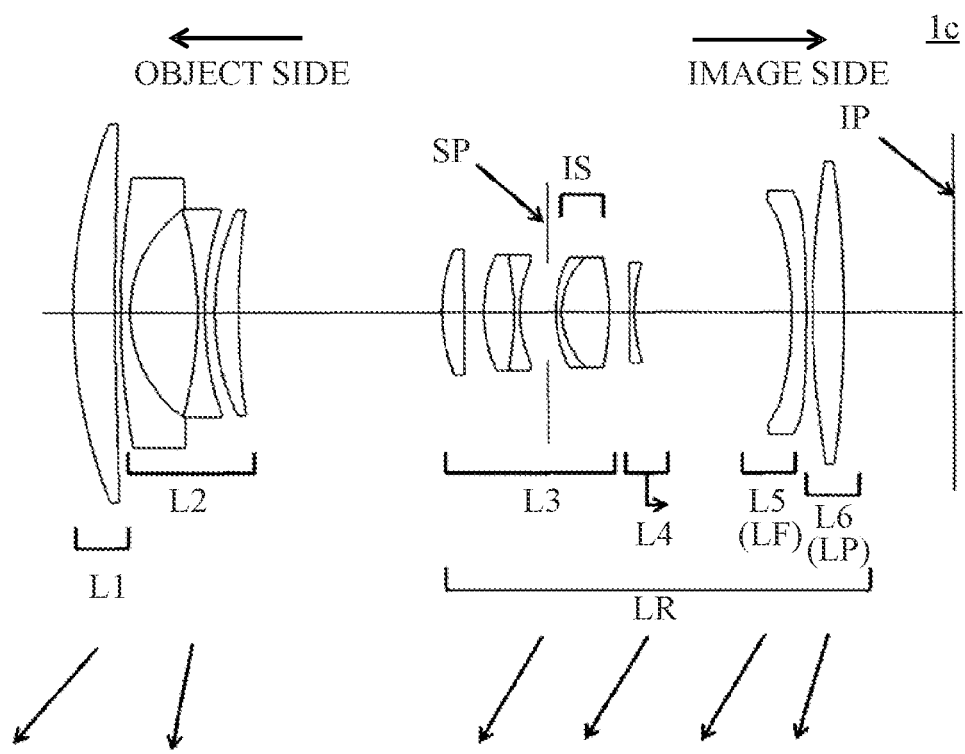
FIG. 7 is a lens sectional view of a zoom lens according to a third embodiment at a wide-angle end when an object at infinity is focused.
Figure 8:
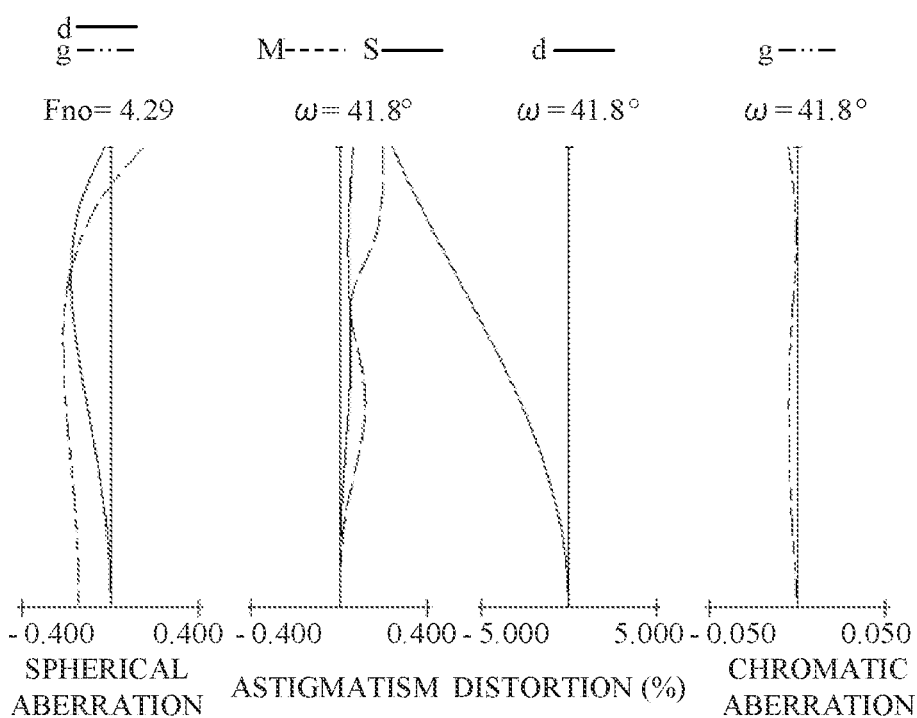
FIG. 8 is a longitudinal aberration diagram of the zoom lens according to the third embodiment at the wide-angle end when the object at infinity is focused.
Figure 9:
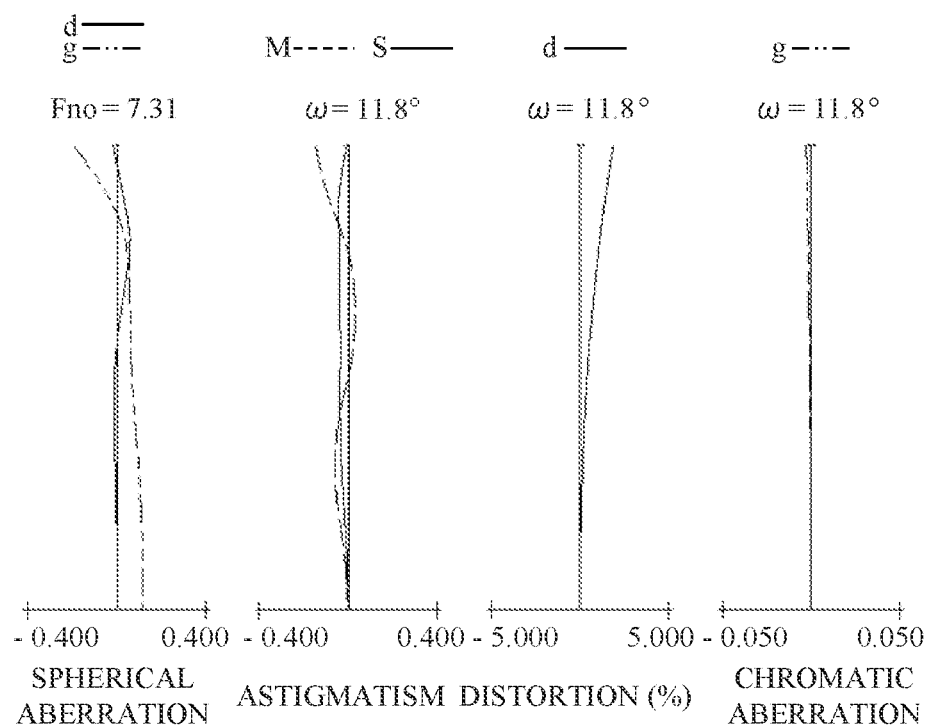
FIG. 9 is a longitudinal aberration diagram of the zoom lens according to the third embodiment at a telephoto end when the object at infinity is focused.

FIG. 7 is a sectional view of the zoom lens 1c according to a third embodiment of the present invention when the object at infinity is focused at the wide-angle end. FIG. 8 is a longitudinal aberration diagram when an object at infinity is focused at the wide-angle end of the zoom lens 1c. FIG. 9 is a longitudinal aberration diagram when the object at infinity is focused at the telephoto end of the zoom lens 1c.

Figure 10:
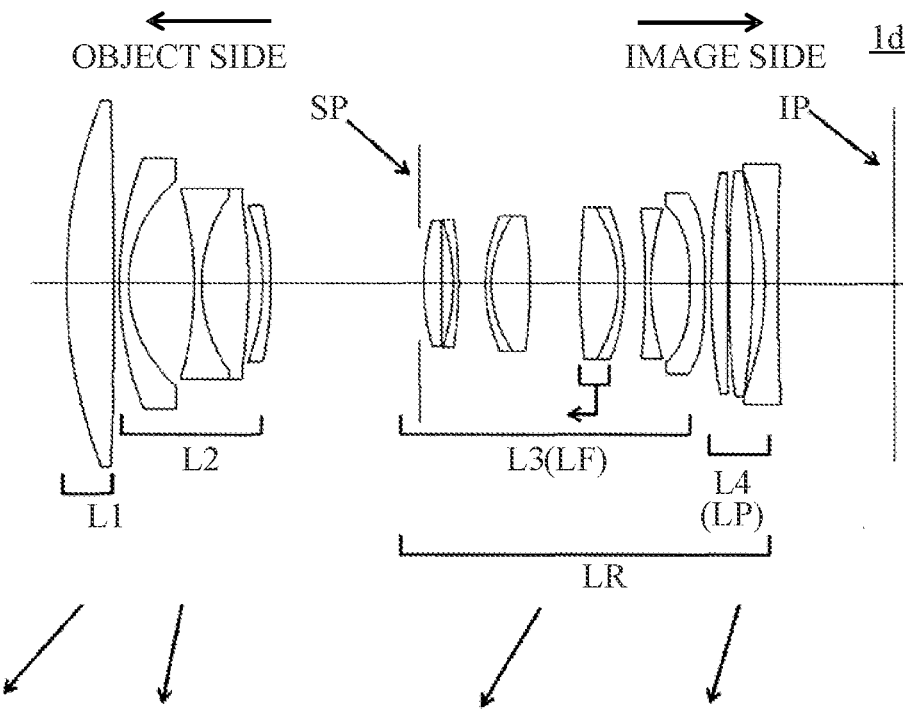
FIG. 10 is a lens sectional view of a zoom lens according to a fourth embodiment at a wide-angle end when an object at infinity is focused.
Figure 11:
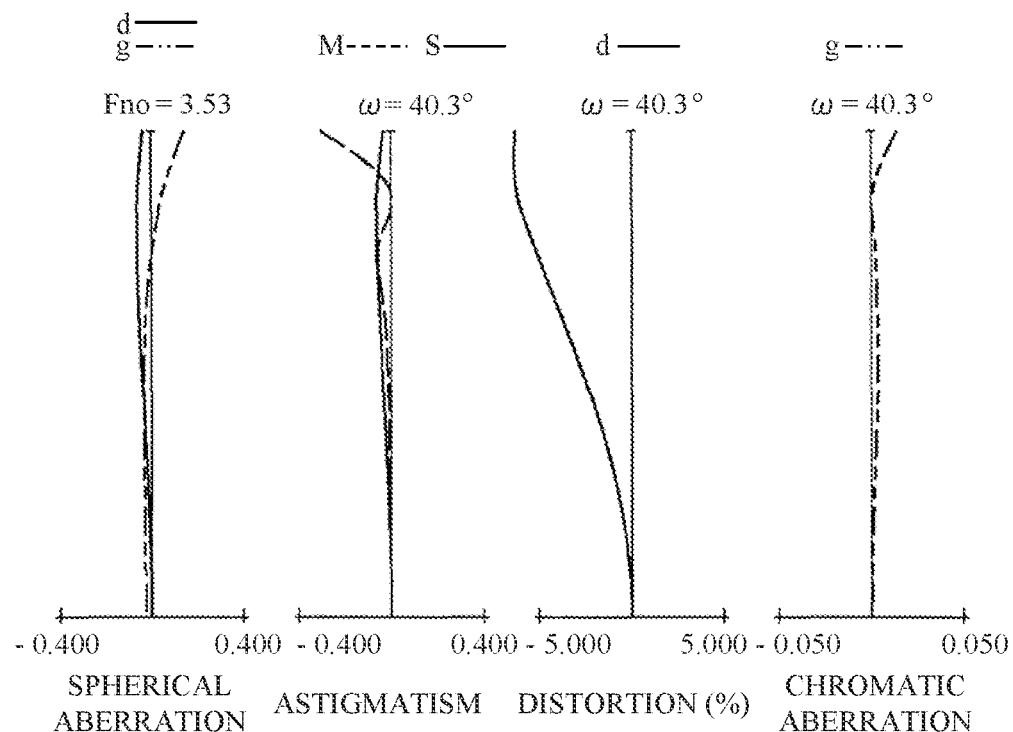
FIG. 11 is a longitudinal aberration diagram of the zoom lens according to the fourth embodiment at the wide-angle end when the object at infinity is focused.
Figure 12:
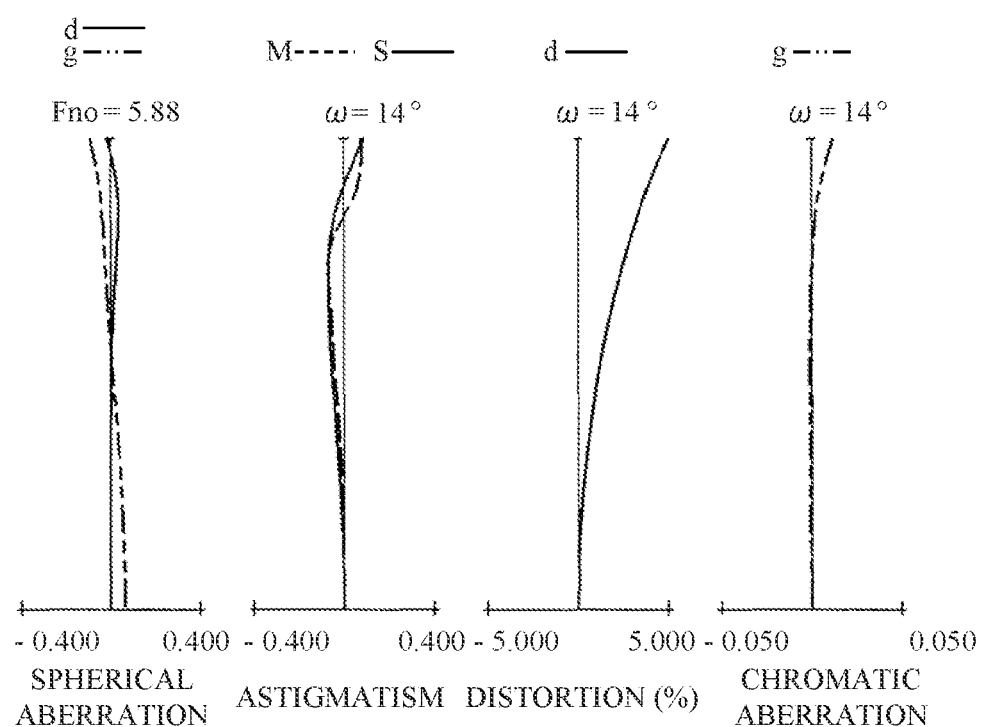
FIG. 12 is a longitudinal aberration diagram of the zoom lens according to the fourth embodiment at a telephoto end when the object at infinity is focused.

FIG. 10 is a sectional view of the zoom lens 1d according to a fourth embodiment of the present invention when the object at infinity is focused at the wide-angle end. FIG. 11 is a longitudinal aberration diagram when the object at infinity is focused at the wide-angle end of the zoom lens 1d. FIG. 12 is a longitudinal aberration diagram when the object at infinity is focused at the telephoto end of the zoom lens 1d.

Figure 13:
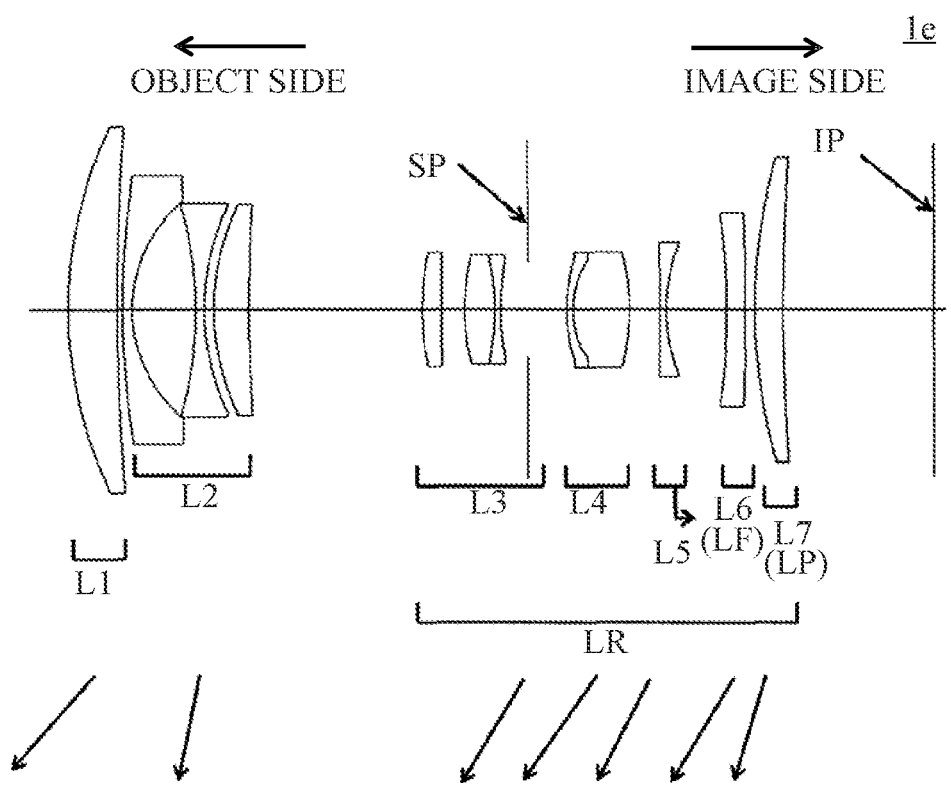
FIG. 13 is a lens sectional view of a zoom lens according to a fifth embodiment at a wide-angle end when an object at infinity is focused.
Figure 14:
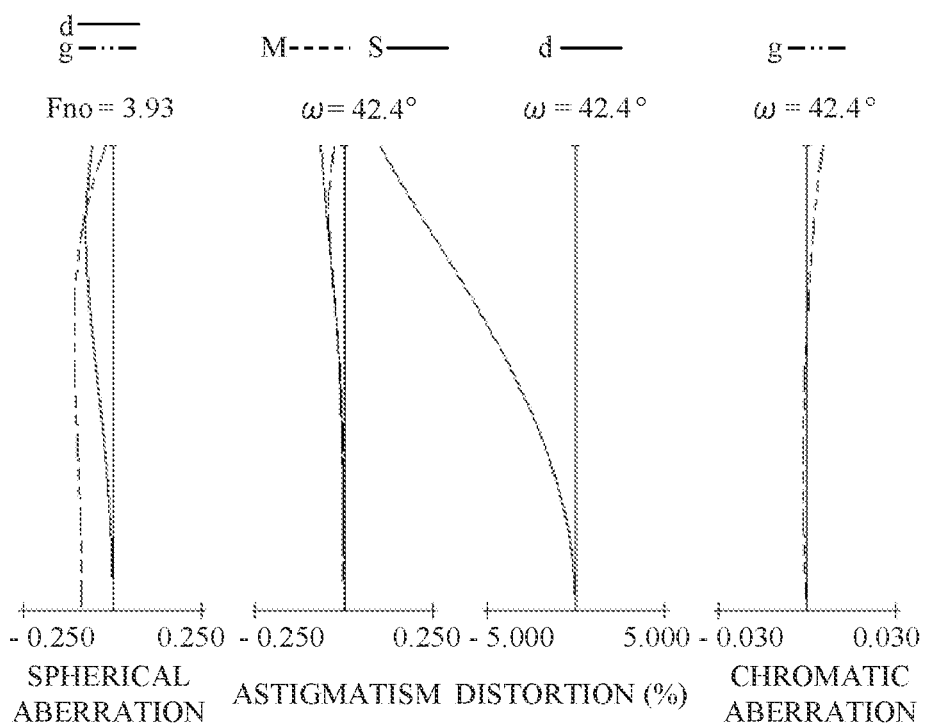
FIG. 14 is a longitudinal aberration diagram of the zoom lens according to the fifth embodiment at the wide-angle end when the object at infinity is focused.
Figure 15:
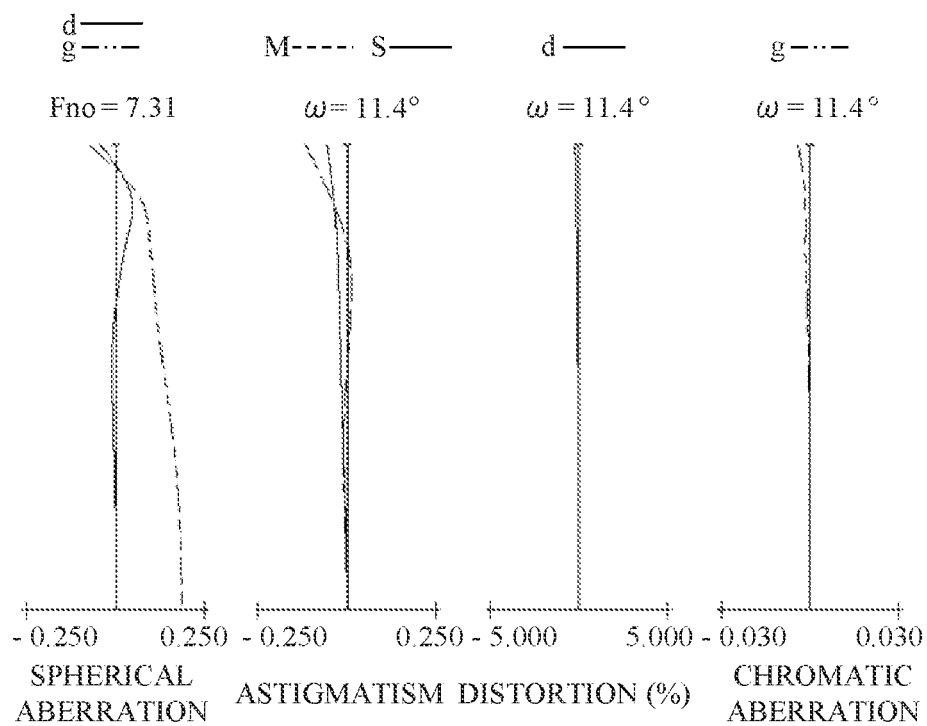
FIG. 15 is a longitudinal aberration diagram of the zoom lens according to the fifth embodiment at a telephoto end when the object at infinity is focused.

FIG. 13 is a lens sectional view of the zoom lens 1e according to Embodiment 5 of the present invention when the object at infinity is focused at the wide-angle end. FIG. 14 is a longitudinal aberration diagram when the object at infinity is focused at the wide-angle end of the zoom lens 1e. FIG. 15 is a longitudinal aberration diagram when the object at infinity is focused at the telephoto end of the zoom lens 1e.

The zoom lens according to each embodiment includes an imaging lens system (optical system) used for an imaging apparatus (image pickup apparatus) such as a video camera, a digital camera, or a film-based camera. In FIGS. 1, 4, 7, 10, and 13, the left side is the object side (front side) and the right side is the image side (backside).

In the lens sectional view in FIG. 1, L1 is a first lens unit having a positive refractive power, L2 is a second lens unit having a negative refractive power, L3 is a third lens unit having a positive refractive power, and L4 is a negative refractive power, L5 is a fifth lens unit having a negative refractive power, and L6 is a sixth lens unit having a positive refractive power. The third lens unit L4, the fifth lens unit L5 (lens unit LF), and the sixth lens unit L6 (lens unit LP) constitute a subsequent unit LR. The lens unit LF is disposed adjacent to the lens unit LP on the object side of the lens unit LP. The third lens unit L3 is disposed adjacent to the second lens unit L2 on the image side of the second lens unit L2 among the lens units included in the subsequent unit LR.

In the lens sectional view in FIG. 4, L1 is a first lens unit having a positive refractive power, L2 is a second lens unit having a negative refractive power, L3 is a third lens unit having a positive refractive power, L4 is a fourth lens unit having a positive refractive power, L5 is a fifth lens unit having a negative refractive power, L6 is a sixth lens unit having a negative refractive power, and L7 is a seventh lens unit having a positive refractive power. The third lens unit L3, the fourth lens unit L4, the fifth lens unit L5, the sixth lens unit L6 (lens unit LF), and the seventh lens unit L7 (lens unit LP) constitute a subsequent unit LR. The lens unit LF is disposed adjacent to the lens unit LP on the object side of the lens unit LP. The third lens unit L3 is disposed adjacent to the second lens unit L2 on the image side of the second lens unit L2 among the lens units included in the subsequent unit LR.

In the lens sectional view of FIG. 7, L1 is a first lens unit having a positive refractive power, L2 is a second lens unit having a negative refractive power, L3 is a third lens unit having a positive refractive power, L4 is a fourth lens unit having a negative refractive power, L5 is a fifth lens unit having a negative refractive power, and L6 is a sixth lens unit having a positive refractive power. The third lens unit L3, the fourth lens unit L4, the fifth lens unit L5 (lens unit LF), and the sixth lens unit L6 (lens unit LP) constitute a subsequent unit LR. The lens unit LF is disposed adjacent to the lens unit LP on the object side of the lens unit LP. The third lens unit L3 is disposed adjacent to the second lens unit L2 on the image side of the second lens unit L2 among the lens units included in the subsequent unit LR.

In the lens sectional view of FIG. 10, L1 is a first lens unit having a positive refractive power, L2 is a second lens unit having a negative refractive power, L3 is a third lens unit having a positive refractive power, and L4 is fourth lens unit having a positive refractive power. The third lens unit L3 (the lens unit LF) and the fourth lens unit L4 (the lens unit LP) constitute a subsequent unit LR. The lens unit LF is disposed adjacent to the lens unit LP on the object side of the lens unit LP. The third lens unit L3 is disposed adjacent to the second lens unit L2 on the image side of the second lens unit L2 among the lens units included in the subsequent unit LR.

In the lens sectional view of FIG. 13, L1 is a first lens unit having a positive refractive power, L2 is a second lens unit having a negative refractive power, L3 is a third lens unit having a positive refractive power, L4 is a fourth lens unit having a positive refractive power, L5 is a fifth lens unit having a negative refractive power, L6 is a sixth lens unit having a negative refractive power, and L7 is a seventh lens unit having a positive refractive power. The third lens unit L3, the fourth lens unit L4, the fifth lens unit L5, the sixth lens unit L6 (lens unit LF), and the seventh lens unit L7 (lens unit LP) constitute a subsequent unit LR. The lens unit LF is disposed adjacent to the lens unit LP on the object side of the lens unit LP. The third lens unit L3 is disposed adjacent to the second lens unit L2 on the image side of the second lens unit L2 among the lens units included in the subsequent unit LR.

Herein, the refractive power is an optical power, and is a reciprocal of the focal length. In FIGS. 4 and 7, IS is an image stabilization lens unit that corrects an image blur moves in a direction having a component orthogonal to the optical axis OA of the zoom lens to move a projection image in the direction orthogonal to the optical axis OA, when the entire zoom lens vibrates. The second embodiment moves the entire fourth lens unit L4 in FIG. 4 in the direction having the component orthogonal to the optical axis OA to correct the image blur (or for the image stabilization). The third embodiment corrects the image blur by moving part of the lens units in the third lens unit L3 in FIG. 7 in the direction having the component orthogonal to the optical axis OA.

In FIGS. 1, 4, 7, 10, and 13, SP denotes a diaphragm (aperture stop), which is disposed in the third lens unit L3. IP is an image plane, and corresponds to an imaging plane of an image sensor (photoelectric conversion element) such as a CCD sensor and a CMOS sensor, or a photosensitive surface of a film surface when used for an imaging optical system of the video camera or digital still camera.

In the aberration diagrams in FIGS. 2, 3, 5, 6, 8, 9, 11, 12, 14, and 15, d and g are d-line and g-line, respectively. ΔM and ΔS are a meridional image plane and a sagittal image plane, respectively. The lateral chromatic aberration is represented by the g-line, w is a half angle of view, and Fno is an F-number (aperture value).

The zoom lens according to each embodiment includes, in order from the object side to the image side, a first lens unit L1 having a positive refractive power, a second lens unit L2 having a negative refractive power, and a subsequent unit LR having a positive refractive power as a whole, and a distance changes between adjacent lens units during zooming. The first lens unit L1 includes a single lens. The subsequent unit LR includes a lens unit LP having a positive refractive power and disposed closest to the image. During zooming from the wide-angle end to the telephoto end, the second lens unit L2 moves to the object side. The subsequent unit LR may include two or more lens units in which the distance changes during zooming. In each embodiment, the wide-angle end and the telephoto end refer to zoom positions when each lens unit is located at both ends of a mechanically movable range on the optical axis. Arrows illustrated in FIGS. 1, 4, 7, 10, and 13 indicate moving trajectories of respective lens units during zooming from the wide-angle end to the telephoto end.

As illustrated in FIG. 1, in the first embodiment, during zooming from the wide-angle end to the telephoto end, the first lens unit L1 moves to the object side as indicated by the arrow. The second lens unit L2 moves toward the object side while increasing the distance between the second lens unit L2 and the first lens unit L1. The third lens unit L3 moves to the object side while reducing the distance between the third lens unit L3 and the second lens unit L2. The fourth lens unit L4 moves toward the object side while increasing the distance between the fourth lens unit L4 and the third lens unit L3. The fifth lens unit L5 moves toward the object side while reducing the distance between the fifth lens unit L5 and the fourth lens unit L4. The sixth lens unit L6 moves toward the object side while increasing the distance between the sixth lens unit L6 and the fifth lens unit L5. During focusing from the object at infinity to the object at a short distance, the fourth lens unit L4 moves to the image side.

As illustrated in FIG. 4, in the second embodiment, during zooming from the wide-angle end to the telephoto end, the first lens unit L1 moves to the object side as indicated by an arrow. The second lens unit L2 moves toward the object side while increasing the distance between the second lens unit L2 and the first lens unit L1. The third lens unit L3 moves to the object side while reducing the distance between the third lens unit L3 and the second lens unit L2. The fourth lens unit L4 moves toward the object side while reducing the distance between the fourth lens unit L4 and the third lens unit L3. The fifth lens unit L5 moves toward the object side while increasing the distance between the fifth lens unit L5 and the fourth lens unit L4. The sixth lens unit L6 moves toward the object side while reducing the distance between the sixth lens unit L6 and the fifth lens unit L5. The seventh lens unit L7 moves toward the object side while increasing the distance between the seventh lens unit L7 and the fifth lens unit L5. During focusing from an object at infinity to a short-distance object, the fifth lens unit L5 moves to the image side.

As illustrated in FIG. 7, in the third embodiment, during zooming from the wide-angle end to the telephoto end, the first lens unit L1 moves to the object side as indicated by the arrow. The second lens unit L2 moves toward the object side while increasing the distance between the second lens unit L2 and the first lens unit L1. The third lens unit L3 moves to the object side while reducing the distance between the third lens unit L3 and the second lens unit L2. The fourth lens unit L4 moves toward the object side while increasing the distance between the fourth lens unit L4 and the third lens unit L3. The fifth lens unit L5 moves toward the object side while reducing the distance between the fifth lens unit L5 and the fourth lens unit L4. The sixth lens unit L6 moves toward the object side while increasing the distance between the sixth lens unit L6 and the fifth lens unit L5. During focusing from an object at infinity to an object at a short distance, the fourth lens unit L4 moves to the image side.

As illustrated in FIG. 10, in the fourth embodiment, during zooming from the wide-angle end to the telephoto end, the first lens unit L1 moves to the object side as indicated by an arrow. The second lens unit L2 moves toward the object side while increasing the distance between the second lens unit L2 and the first lens unit L1. The third lens unit L3 moves to the object side while reducing the distance between the third lens unit L3 and the second lens unit L2. The fourth lens unit L4 moves toward the object side while increasing the distance between the fourth lens unit L4 and the third lens unit L3. During focusing from an object at infinity to an object at a short distance, part of the third lens unit L3 moves to the object side.

As illustrated in FIG. 13, in the fifth embodiment, during zooming from the wide-angle end to the telephoto end, the first lens unit L1 moves to the object side as indicated by an arrow. The second lens unit L2 moves toward the object side while increasing the distance between the second lens unit L2 and the first lens unit L1. The third lens unit L3 moves to the object side while reducing the distance between the third lens unit L3 and the second lens unit L2. The fourth lens unit L4 moves toward the object side while reducing the distance from the third lens unit L3. The fifth lens unit L5 moves toward the object side while increasing the distance between the fifth lens unit L5 and the fourth lens unit L4. The sixth lens unit L6 moves toward the object side while reducing the distance between the sixth lens unit L6 and the fifth lens unit L5. The seventh lens unit L7 moves toward the object side while increasing the distance between the seventh lens unit L7 and the fifth lens unit L5. During focusing from an object at infinity to an object at a short distance, the fifth lens unit L5 moves to the image side.

In each embodiment, focusing may be performed by moving the entire zoom lens or an arbitrary single lens unit.

In the positive lead type zoom lens, it is a critical issue to obtain good optical performance over the entire object distance with a high zoom ratio and a compact entire system. It is important for a solution for this issue to properly set the refractive power and lens configuration of each lens unit, and the moving conditions associated with zooming of each lens unit. If these configurations are not properly set, it is difficult to obtain the compact and lightweight zoom lens having high optical performance over the entire zoom range.

In general, it is necessary for the compact and lightweight lens unit to reduce the number of lenses having a large lens outer diameter (effective lens diameter). In the positive lead type zoom lens, the first lens unit L1 having the largest lens outer diameter may have a minimum number of lenses. However, if the first lens unit L1 has a minimum number of one, it becomes difficult to correct the lateral chromatic aberration especially at the telephoto end. Accordingly, each embodiment makes the first lens unit L1 of a minimum number of one, and uses a high dispersion material for the positive lens in the lens unit LP having a positive refractive power and closest to the image side of the subsequent unit LR. Thereby, the lateral chromatic aberration at the telephoto end generated by the first lens unit L1 is canceled, and the chromatic aberration is well-correction over the entire zoom range.

During zooming, the second lens unit L2 moves to the object side. This configuration can easily reduce the overall optical length (the distance from the first surface, which is the lens surface closest to the object side, to the image plane IP) at the wide-angle end, and reduce the lens outer diameter of the first lens unit L1. As a result, the entire lens system can be made smaller and lighter.

Each embodiment satisfies the following conditional expressions (1) and (2):

$$15.0 < vdLP < 30.0 \quad (1)$$

$$0.50 < fLP/\mathrm{ft} < 2.00 \quad (2)$$

where vdLP is an Abbe number of the material of the lens having the highest refractive power among the positive lenses included in the lens unit LP, ft is a focal length of the zoom lens (a focal length of the entire system) at the telephoto end, and fLP is a focal length of the lens unit LP.

Next follows a description of the technical meaning of each of the conditional expressions. The conditional expression (1) defines the Abbe number vdLP of the material of the lens having the highest refractive power among the positive lenses included in the lens unit LP. As described above, in order to reduce the size and weight of the positive lead zoom lens, it is important to make the first lens unit L1 having the largest diameter of a single lens. In order to achieve high performance over the entire zoom range, it is necessary to correct the lateral chromatic aberration at the telephoto end caused by making the first lens unit L1 of the single lens. Each embodiment cancels the lateral chromatic aberration occurring in the first lens unit L1 having the single positive lens by making high the dispersion of the positive lens included in the positive lens unit Lp closest to the image side, and achieves the compact and high-performance entire lens.

By satisfying conditional expression (1), it becomes easy to correct the lateral chromatic aberration at the telephoto end, and the compact and high-performance entire system can be achieved. When the Abbe number of the material of the lens having the strongest refractive power among the positive lenses included in the lens unit LP becomes larger than the upper limit of the conditional expression (1), the lateral chromatic aberration occurring in the first lens unit L1 including the single positive lens cannot be canceled out, and it becomes difficult to correct the lateral chromatic aberration at the telephoto end. On the other hand, when the Abbe number of the lens having the strongest refractive power among the positive lenses included in the lens unit LP becomes smaller than the lower limit of the conditional expression (1), the lateral chromatic aberration at the telephoto end can be easily corrected but it becomes difficult to correct the axial chromatic aberration over the entire zoom range. In addition, a chromatic aberration amount caused by the eccentricity of the lens during manufacturing increases.

The conditional expression (2) is to properly set the focal length of the lens unit LP. When the focal length of the lens unit LP becomes larger than the upper limit of the conditional expression (2), the lateral chromatic aberration generated in the first lens unit L1 having the single positive lens cannot be canceled, and it is difficult to correct the lateral chromatic aberration at the telephoto end. In addition, the exit pupil becomes too short at the wide-angle end, and it becomes difficult to secure the telecentricity at the wide-angle end. On the other hand, when the focal length of the lens unit LP becomes smaller than the lower limit of the conditional expression (2), it becomes difficult to correct the curvature of field and the distortion at the wide-angle end. In addition, a changing amount of the exit pupil position between the wide-angle end and the telephoto end becomes too large, and it becomes difficult to ensure the telecentricity over the entire zoom range.

The numerical ranges of the conditional expressions (1) and (2) may be set as in the following conditional expressions (1a) and (2a).

$$17.0 < vdLP < 25.0 \quad (1a)$$

$$0.60 < fLP/\mathrm{ft} < 1.50 \quad (2a)$$

The numerical ranges of the conditional expressions (1a) and (2a) may be set as in the following conditional expressions (1b) and (2b).

$$20.0 < vdLP < 25.0 \quad (1b)$$

$$0.60 < fLP/\mathrm{ft} < 1.30 \quad (2b)$$

Assume in each embodiment that fw is a focal length of the entire system at the wide-angle end, f1 is a focal length of the first lens unit L1, and f2 is a focal length of the second lens unit L2. TDw is an overall optical length at the wide-angle end, skw is a backfocus at the wide-angle end, dw is a distance between the lens unit LF and the lens unit LP at the wide-angle end, dt is a distance between the lens unit LF and the lens unit LP at the telephoto end, and mLP is a moving amount of the lens unit LP during zooming from the wide-angle end to the telephoto end. Assume that mL1 is a moving amount of the first lens unit L1 during zooming from the wide-angle end to the telephoto end, mL2 is a moving amount of the second lens unit L2 during zooming from the wide-angle end to the telephoto end, and mL3 is a moving amount of the third lens unit L3 during zooming from the wide-angle end to the telephoto end. Herein, the sign of the moving amount of each lens unit is such that the moving amount from the object side to the image side is set to be positive and the moving amount from the image side to the object side is set to be negative. Then, in each embodiment, at least one of the following conditional expressions (3) to (10) may be satisfied.

$$0.80 < f1/\mathrm{ft} < 2.00 \quad (3)$$

$$-1.10 < f2/fw < -0.50 \quad (4)$$

$$3.50 < TDw/fw < 5.00 \quad (5)$$

$$0.30 < skw/fw < 1.00 \quad (6)$$

$$0.05 < (dt - dw)/ft < 0.40 \quad (7)$$

$$-0.30 < mLP/ft < -0.05 \quad (8)$$

$$-0.40 < mL2/ft < 0.00 \quad (9)$$

$$1.00 < mL1/mL3 < 2.00 \quad (10)$$

A description will now be given of the technical meanings of the conditional expressions (3) to (10). The conditional expression (3) is to properly set the focal length of the first lens unit L1. When the positive refractive power of the first lens unit L1 becomes weaker than the upper limit of the conditional expression (3), the moving amount of the first lens unit L1 must be increased for magnification variations and the overall lens length becomes disadvantageously long at the telephoto end. Further, it is difficult to reduce the effective diameter of the front lens. On the other hand, when the positive refractive power of the first lens unit L1 becomes stronger than the lower limit of the conditional expression (3), a high zoom ratio is available but it becomes difficult to correct the spherical aberration at the telephoto end.

The conditional expression (4) is to properly set the focal length of the second lens unit L2. By satisfying conditional expression (4), it becomes easy to provide a retrofocus type refractive power arrangement at the wide-angle end, and to obtain a wide angle of view at the wide-angle end, few fluctuations of various aberrations over the entire zoom range, and the high optical performance over the entire image. When the negative refractive power of the second lens unit L2 becomes stronger than the upper limit of the conditional expression (4) (or when the absolute value of the focal length is reduced), it becomes difficult to reduce the fluctuations of spherical aberration and lateral chromatic aberration due to zooming. When the negative refractive power of the second lens unit L2 becomes weaker than the lower limit of conditional expression (4) (or when the absolute value of the focal length becomes larger), it becomes difficult to provide the retrofocus type refractive power arrangement and it is difficult to widen the imaging angle of view at the wide-angle end.

The conditional expression (5) is to properly set a ratio between the optical total length TDw at the wide-angle end and the focal length at the wide-angle end. When the overall optical length at the wide-angle end becomes longer than the upper limit of the conditional expression (5) the diameter of the first lens unit L1 increases, and it is difficult to reduce the size and weight. On the other hand, if the overall optical length TDw at the wide-angle end becomes shorter than the lower limit of the conditional expression (5), the refracting powers of the first lens unit L1 and the second lens unit L2 becomes too strong, and it is difficult to correct the spherical aberration at the telephoto end and the curvature of field at the wide-angle end.

The conditional expression (6) defines a ratio between the focal length of the entire system at the wide-angle end and the backfocus at the wide-angle end. When the backfocus at the wide-angle end becomes longer than the upper limit of the conditional expression (6), the refractive power of the lens unit LP becomes too strong and it becomes difficult to correct the curvature of field at the wide-angle end. Further, it becomes difficult to shorten the overall lens length at the wide-angle end. On the other hand, when the backfocus at the wide-angle end becomes shorter than the lower limit of the conditional expression (6), it is necessary to increase the moving amount of the lens unit LP in order to correct the lateral chromatic aberration at the telephoto end, and thus it becomes difficult to make compact the overall lens length.

The conditional expression (7) defines distance changes of the lens unit LF and the lens unit LP between the wide-angle end and the telephoto end. By satisfying the conditional expression (7), it is easy to achieve both the high magnification and high performance. If the distance between the lens units LF and LP at the telephoto end becomes longer than the upper limit of conditional expression (7), the high magnification becomes easy but it is difficult to reduce the diameter of the lens unit LP at the telephoto end. On the other hand, when the distance between the lens units LF and LP at the telephoto end is shorter than the lower limit of the conditional expression (7), a sufficient magnification variation is unavailable and the high magnification becomes difficult.

The conditional expression (8) is to properly set the moving amount of the lens unit LP during zooming. By satisfying the conditional expression (8), it becomes easy to correct the lateral chromatic aberration over the entire zoom range. If the moving amount of the lens unit LP during zooming is larger than the upper limit of the conditional expression (8), it becomes difficult to reduce the overall lens length at the telephoto end. On the other hand, if the moving amount of the lens unit LP during zooming is smaller than the lower limit of the conditional expression (8), the effect of correcting the lateral chromatic aberration by the lens unit LP at the telephoto end is reduced, and it is difficult to reduce the lateral chromatic aberration at the telephoto end.

The conditional expression (9) is to properly set the moving amount of the second lens unit L2 during zooming. By satisfying the conditional expression (9), it becomes easy to shorten the overall lens length at the wide-angle end. When the moving amount of the second lens unit L2 during zooming is larger than the upper limit of the conditional expression (9), it becomes difficult to reduce the overall lens length at the telephoto end. On the other hand, when the moving amount of the second lens unit L2 during zooming is smaller than the lower limit of the conditional expression (9), it becomes difficult to reduce the fluctuations of the spherical aberration and the lateral chromatic aberration during zooming. In addition, the overall lens length at the wide-angle end increases, and it becomes difficult to reduce the effective diameter of the front lens at the wide-angle end.

The conditional expression (10) is to properly set a ratio between the moving amount of the first lens unit L1 and a moving amount of the third lens unit L3 during zooming. If the value is higher than the upper limit of the conditional expression (10) and the moving amount of the first lens unit L1 is too large, the effective diameter of the front lens becomes large at the telephoto end so as to secure the peripheral light amount. On the other hand, when the value is lower than the lower limit of the conditional expression (10) and the moving amount of the third lens unit L3 becomes too small, it becomes difficult to reduce the fluctuations of the spherical aberration and the F-number during zooming. In addition, the overall length of the lens at the wide-angle end becomes longer, and it becomes difficult to reduce the effective diameter of the front lens at the wide-angle end.

In each embodiment, the numerical ranges of the conditional expressions (3) to (10) may be set as the following conditional expressions (3a) to (10a).

$$0.90 < f1/ft < 1.90 \quad (3a)$$

$$-1.00 < f2/fw < -0.60 \quad (4a)$$

$$4.00 < TDw/fw < 4.80 \quad (5a)$$

$$0.40 < skw/fw < 0.90 \quad (6a)$$

$$0.10 < (dt - dw)/ft < 0.35 \quad (7a)$$

$$-0.25 < mLP/ft < -0.10 \quad (8a)$$

$$-0.35 < mL2/ft < -0.05 \quad (9a)$$

$$1.10 < mL1/mL3 < 1.70 \quad (10a)$$

In each embodiment, the numerical ranges of the conditional expressions (3a) to (10a) may be set as in the following conditional expressions (3b) to (10b).

$$0.90 < f1/ft < 1.80 \quad (3b)$$

$$-0.90 < f2/fw < -0.70 \quad (4b)$$

$$4.10 < TDw/fw < 4.70 \quad (5b)$$

$$0.50 < skw/fw < 0.90 \quad (6b)$$

$$0.12 < (dt - dw)/ft < 0.32 \quad (7b)$$

$$-0.23 < mLP/ft < -0.12 \quad (8b)$$

$$-0.30 < mL2/ft < -0.08 \quad (9b)$$

$$1.20 < mL1/mL3 < 1.60 \quad (10b)$$

As described above, each embodiment can provide a compact and lightweight zoom lens that provides high performance over the overall zoom range.

A description will be given of numerical examples 1 to 5 corresponding to the first to fifth embodiments, respectively. In surface data of each numerical example, r indicates a radius of curvature of each optical surface, and d (mm) indicates an axial distance (distance on the optical axis) between an m-th surface and an (m+1)-th surface, where m is the number of the surface counted from the light incident side. In addition, nd represents a refractive index of each optical element relative to the d-line, and vd represents the Abbe number based on the d-line of the optical element. The Abbe number vd of a certain material is expressed as follows, $$vd = (Nd - 1)/(NF - NC)$$

where Nd, NF, and NC are the refractive indices of the Fraunhofer line for the d-line (587.6 nm), the F-line (486.1 nm), and the C-line (656.3 nm).

In each numerical example, all values of d, focal length f (mm), F-number Fno, and half angle of view (degree) are set when the optical system of each example focuses on the object at infinity. The "backfocus" is a distance expressed on the optical axis from the final lens surface (the lens surface closest to the image side) to the paraxial image surface in terms of the air conversion length. The "overall lens length" is a length obtained by adding the backfocus to the distance on the optical axis from the front surface (the lens surface closest to the object) to the final surface in the zoom lens. The "lens unit" may include a plurality of lenses or only a single lens.

When the optical surface is aspherical, a symbol * is added to the right of the surface number. The aspherical shape is expressed as follows:

$$x = (h^2/R)/\left[1 + \{1 - (1+k)(h/R)^2\}^{1/2}\right] + A4 \times h^4 + A6 \times h^6 + A8 \times h^8 + A10 \times h^{10} + A12 \times h^{12}$$

where X is a displacement amount from a surface vertex in the optical axis direction, h is a height from the optical axis in a direction orthogonal to the optical axis, R is a paraxial radius of curvature, and k is a conic constant, A4, A6, A8, A10, and A12 are aspheric coefficients of respective orders, "e±XX" in each aspheric coefficient means "×10$^{\pm XX}$". Table 1 shows the relationship between the conditional expressions and various numerical values in the numerical examples ("NEs").

Numerical Example 1

| UNIT: mm | | | | |
|---|---|---|---|---|
| SURFACE DATA | | | | |
| SURFACE NUMBER | r | d | nd | vd |
| 1 | 61.653 | 6.43 | 1.55032 | 75.5 |
| 2 | 1155.076 | (Variable) | | |
| 3 | 32.781 | 1.10 | 1.83481 | 42.7 |
| 4 | 15.055 | 8.37 | | |
| 5 | −62.356 | 0.90 | 1.55032 | 75.5 |
| 6 | 16.818 | 4.18 | 1.85478 | 24.8 |
| 7 | 83.016 | 3.80 | | |
| 8 | −24.903 | 1.00 | 2.05090 | 26.9 |
| 9 | −42.546 | (Variable) | | |
| 10(Diaphragm) | ∞ | 0.50 | | |
| 11 | 26.766 | 3.17 | 1.69680 | 55.5 |
| 12 | −180.403 | 5.17 | | |
| 13 | −18.532 | 0.80 | 1.65412 | 39.7 |
| 14 | −79.100 | 1.04 | | |
| 15 | 27.363 | 6.02 | 1.49700 | 81.5 |
| 16 | −24.450 | 0.30 | | |
| 17* | 50.011 | 5.22 | 1.61881 | 63.9 |
| 18 | −16.901 | 0.80 | 2.00100 | 29.1 |

-continued

| UNIT: mm | | | | |
|---|---|---|---|---|
| 19 | −27.558 | (Variable) | | |
| 20 | 38.596 | 0.70 | 1.83481 | 42.7 |
| 21 | 18.701 | (Variable) | | |
| 22* | −18.185 | 1.80 | 1.58313 | 59.4 |
| 23* | −58.608 | (Variable) | | |
| 24 | 317.669 | 5.49 | 1.92286 | 20.9 |
| 25 | −45.002 | 1.60 | 1.83481 | 42.7 |
| 26 | −107.742 | (Variable) | | |
| Image Plane | ∞ | | | |

ASPHERIC DATA

Seventeenth surface
K = 0.00000e+000 A 4 = −4.77064e−005 A 6 = −7.03387e−008 A 8 = 9.45719e−011
A10 = −9.33095e−013 A12 = −4.59154e−015
Twenty-second surface
K = 0.00000e+000 A 4 = 1.90579e−005 A 6 = −1.16385e−007 A 8 = 1.83169e−009
A10 = −1.03752e−011 A12 = −2.09143e−014
Twenty-third surface
K = 0.00000e+000 A 4 = 3.85448e−006 A 6 = −1.22574e−007 A 8 = 1.15603e−009
A10 = −7.76835e−012 A12 = 1.22075e−014

VARIOUS DATA
ZOOM RATIO 2.75

| | WIDE-ANGLE | MIDDLE | TELEPHOTO |
|---|---|---|---|
| FOCAL LENGTH | 24.72 | 44.11 | 67.90 |
| Fno | 4.12 | 4.12 | 4.12 |
| HALF VIEW ANGLE | 41.50 | 26.13 | 17.30 |
| IMAGE HEIGHT | 19.69 | 21.64 | 21.64 |
| OVERALL LENS LENGTH | 101.50 | 114.91 | 141.15 |
| BF | 12.50 | 17.92 | 24.86 |
| d2 | 0.70 | 10.38 | 25.91 |
| d9 | 13.47 | 4.16 | 1.83 |
| d19 | 2.50 | 3.82 | 2.50 |
| d21 | 13.15 | 11.84 | 13.15 |
| d23 | 0.80 | 8.42 | 14.52 |
| d26 | 12.50 | 17.92 | 24.86 |

ZOOM LENS UNIT DATA

| UNIT | START SURFACE | FOCAL LENGTH |
|---|---|---|
| 1 | 1 | 118.10 |
| 2 | 3 | −18.47 |
| 3 | 10 | 19.19 |
| 4 | 20 | −44.17 |
| 5 | 22 | −45.97 |
| 6 | 24 | 80.02 |

Numerical Example 2

| UNIT: mm | | | | |
|---|---|---|---|---|
| SURFACE DATA | | | | |
| SURFACE NUMBER | r | d | nd | vd |
| 1 | ∞ | 1.50 | | |
| 2 | 56.604 | 5.09 | 1.59282 | 68.6 |
| 3 | 300.042 | (Variable) | | |
| 4 | 132.928 | 1.15 | 2.05090 | 26.9 |
| 5 | 18.521 | 7.53 | | |
| 6 | −41.495 | 0.90 | 1.49700 | 81.5 |
| 7 | 42.419 | 1.25 | | |
| 8 | 36.111 | 3.47 | 1.92286 | 20.9 |
| 9 | 670.026 | (Variable) | | |
| 10 | 27.035 | 2.54 | 1.85883 | 30.0 |
| 11 | −180.437 | 1.48 | | |
| 12 | 21.693 | 5.85 | 1.48749 | 70.2 |
| 13 | −33.770 | 0.70 | 2.00069 | 25.5 |
| 14 | 31.881 | 2.54 | | |

| UNIT: mm | | | | |
|---|---|---|---|---|
| 15(Diaphragm) | ∞ | (Variable) | | |
| 16 | 17.291 | 0.70 | 1.90043 | 37.4 |
| 17 | 9.388 | 6.16 | 1.61881 | 63.9 |
| 18* | −31.274 | (Variable) | | |
| 19 | 132.686 | 0.60 | 1.74100 | 52.6 |
| 20 | 17.363 | (Variable) | | |
| 21* | −45.424 | 1.80 | 1.53110 | 55.9 |
| 22* | −6598.957 | (Variable) | | |
| 23 | 116.299 | 3.50 | 1.92286 | 20.9 |
| 24 | −168.312 | (Variable) | | |
| Image Plane | ∞ | | | |

ASPHERIC DATA

Eighteenth surface
K = 0.00000e+000 A 4 = 3.44987e−005 A 6 = −2.35349e−007 A 8 = 2.95704e−009
A10 = −1.16526e−010 A12 = 8.76781e−013

Twenty-first surface
K = 0.00000e+000 A 4 = −4.51694e−005 A 6 = 1.26365e−007 A 8 = 1.24055e−009
A10 = −2.14786e−011 A12 = 9.63499e−014

Twenty-second surface
K = 0.00000e+000 A 4 = −5.11073e−005 A 6 = 2.11344e−007 A 8 = −7.26896e−010
A10 = −1.97768e−012 A12 = 1.61057e−014

VARIOUS DATA
ZOOM RATIO 4.71

| | WIDE-ANGLE | MIDDLE | TELEPHOTO |
|---|---|---|---|
| FOCAL LENGTH | 24.72 | 73.51 | 116.40 |
| Fno | 4.04 | 5.99 | 7.31 |
| HALF VIEW ANGLE | 41.80 | 16.40 | 10.30 |
| IMAGE HEIGHT | 19.90 | 21.64 | 21.64 |
| OVERALL LENS LENGTH | 109.01 | 131.75 | 159.02 |
| BF | 14.15 | 27.66 | 31.01 |
| d3 | 0.70 | 26.43 | 39.45 |
| d9 | 27.91 | 4.42 | 0.80 |
| d15 | 3.43 | 1.21 | 1.22 |
| d18 | 2.51 | 5.52 | 5.36 |
| d20 | 12.74 | 11.96 | 12.11 |
| d22 | 0.80 | 7.78 | 22.31 |
| d24 | 14.15 | 27.66 | 31.01 |

ZOOM LENS UNIT DATA

| UNIT | START SURFACE | FOCAL LENGTH |
|---|---|---|
| 1 | 1 | 116.78 |
| 2 | 4 | −22.18 |
| 3 | 10 | 39.32 |
| 4 | 16 | 24.78 |
| 5 | 19 | −27.02 |
| 6 | 21 | −86.13 |
| 7 | 23 | 74.97 |

Numerical Example 3

| UNIT: mm | | | | |
|---|---|---|---|---|
| SURFACE DATA | | | | |
| SURFACE NUMBER | r | d | nd | vd |
| 1 | 60.794 | 5.12 | 1.60311 | 60.6 |
| 2 | 540.251 | (Variable) | | |
| 3 | 94.023 | 1.15 | 1.90366 | 31.3 |
| 4 | 15.577 | 8.20 | | |
| 5 | −44.302 | 0.90 | 1.48749 | 70.2 |
| 6 | 38.054 | 1.23 | | |
| 7 | 29.650 | 2.91 | 1.92286 | 20.9 |
| 8 | 90.077 | (Variable) | | |
| 9 | 19.857 | 2.71 | 1.80518 | 25.4 |
| 10 | 1806.956 | 2.40 | | |

| | | UNIT: mm | | |
|---|---|---|---|---|
| 11 | 16.245 | 3.73 | 1.59522 | 67.7 |
| 12 | −34.957 | 0.70 | 2.00069 | 25.5 |
| 13 | 14.396 | 3.41 | | |
| 14(Diaphragm) | ∞ | 1.00 | | |
| 15 | 14.310 | 0.70 | 1.83481 | 42.7 |
| 16 | 8.746 | 5.79 | 1.58313 | 59.4 |
| 17* | −28.898 | (Variable) | | |
| 18 | 297.133 | 0.60 | 1.56384 | 60.7 |
| 19 | 19.207 | (Variable) | | |
| 20* | −58.341 | 1.80 | 1.53110 | 55.9 |
| 21* | ∞ | (Variable) | | |
| 22 | 111.997 | 3.77 | 1.84666 | 23.8 |
| 23 | −140.972 | (Variable) | | |
| Image Plane | ∞ | | | |

ASPHERIC DATA

Seventeenth surface
K = 0.00000e+000 A 4 = 3.30656e−005 A 6 = −2.69644e−007 A 8 = 4.13244e−009
A10 = −2.06529e−010 A12 = 1.91719e−012
Twentieth surface
K = 0.00000e+000 A 4 = −4.65816e−005 A 6 = 5.61223e−008 A 8 = 3.33907e−009
A10 = −3.00761e−011 A12 = 5.77510e−014
Twenty-first surface
K = 0.00000e+000 A 4 = −4.90223e−005 A 6 = 1.69299e−007 A 8 = 8.90412e−010
A10 = −1.11111e−011 A12= 2.20477e−014

VARIOUS DATA
ZOOM RATIO 4.12

| | WIDE-ANGLE | MIDDLE | TELEPHOTO |
|---|---|---|---|
| FOCAL LENGTH | 24.72 | 67.42 | 101.85 |
| Fno | 4.29 | 6.16 | 7.31 |
| HALF VIEW ANGLE | 41.80 | 17.79 | 11.80 |
| IMAGE HEIGHT | 19.90 | 21.64 | 21.64 |
| OVERALL LENS LENGTH | 107.52 | 130.63 | 158.03 |
| BF | 13.48 | 31.00 | 35.52 |
| d2 | 0.70 | 21.58 | 33.94 |
| d8 | 24.80 | 3.76 | 0.80 |
| d17 | 2.50 | 7.72 | 7.68 |
| d19 | 19.13 | 13.91 | 13.95 |
| d21 | 0.80 | 6.53 | 20.03 |
| d23 | 13.48 | 31.00 | 35.52 |

ZOOM LENS UNIT DATA

| UNIT | START SURFACE | FOCAL LENGTH |
|---|---|---|
| 1 | 1 | 113.13 |
| 2 | 3 | −90.90 |
| 3 | 9 | 22.77 |
| 4 | 18 | −36.45 |
| 5 | 20 | −109.85 |
| 6 | 22 | 74.22 |

Numerical Example 4

| | UNIT: mm | | | |
|---|---|---|---|---|
| SURFACE DATA | | | | |
| SURFACE NUMBER | r | d | nd | vd |
| 1 | 60.474 | 5.85 | 1.49700 | 81.5 |
| 2 | −681.696 | (Variable) | | |
| 3 | 41.730 | 1.10 | 2.05090 | 26.9 |
| 4 | 16.292 | 8.08 | | |
| 5 | −42.296 | 0.90 | 1.59522 | 67.7 |
| 6 | 18.502 | 5.72 | 1.85478 | 24.8 |
| 7 | −73.854 | 1.74 | | |
| 8 | −26.626 | 1.00 | 2.05090 | 26.9 |
| 9 | −48.961 | (Variable) | | |

-continued

| UNIT: mm | | | | |
|---|---|---|---|---|
| 10(Diaphragm) | ∞ | 0.50 | | |
| 11 | 27.935 | 2.20 | 1.72916 | 54.7 |
| 12 | 87061.983 | 1.42 | | |
| 13 | −24.946 | 0.70 | 1.70154 | 41.2 |
| 14 | −48.103 | 3.30 | | |
| 15 | 20.111 | 0.70 | 1.83400 | 37.2 |
| 16 | 14.032 | 4.79 | 1.53775 | 74.7 |
| 17 | −54.203 | 6.06 | | |
| 18* | 50.009 | 4.70 | 1.61881 | 63.9 |
| 19 | −17.299 | 0.80 | 2.05090 | 26.9 |
| 20 | −25.498 | 2.50 | | |
| 21 | −94.397 | 0.70 | 1.90525 | 35.0 |
| 22 | 29.850 | 4.79 | | |
| 23* | −44.850 | 1.80 | 1.85135 | 40.1 |
| 24* | −10849.867 | (Variable) | | |
| 25 | 83.939 | 2.03 | 1.84666 | 23.8 |
| 26 | 9244.030 | 0.15 | | |
| 27 | 130.012 | 2.94 | 1.84666 | 23.8 |
| 28 | −82.622 | 1.50 | | |
| 29 | −37.135 | 1.60 | 1.60311 | 60.6 |
| 30 | 461.088 | (Variable) | | |
| Image Plane | ∞ | | | |

ASPHERIC DATA

Eighteenth surface
K = 0.00000e+000 A 4 = −4.15939e−005 A 6 = −7.39851e−008 A 8 = −6.80207e−010
A10 = 2.30836e−011 A12 = −1.37492e−013
Twenty-third surface
K = 0.00000e+000 A 4 = −2.36326e−004 A 6 = 9.85518e−007 A 8 = −3.06037e−009
A10 = −5.95740e−011 A12 = −5.35489e−014
Twenty-fourth surface
K = 0.00000e+000 A 4 = −2.05968e−004 A 6 = 1.36386e−006 A 8 = −7.52157e−009
A10 = 6.50764e−013 A12 = 7.19143e−014

VARIOUS DATA
ZOOM RATIO 3.34

| | WIDE-ANGLE | MIDDLE | TELEPHOTO |
|---|---|---|---|
| FOCAL LENGTH | 24.72 | 47.47 | 82.45 |
| Fno | 3.53 | 4.79 | 5.88 |
| HALF VIEW ANGLE | 38.53 | 24.50 | 14.70 |
| IMAGE HEIGHT | 19.69 | 21.64 | 21.64 |
| OVERALL LENS LENGTH | 101.50 | 116.56 | 142.50 |
| BF | 14.16 | 25.46 | 32.52 |
| d2 | 0.70 | 12.43 | 29.49 |
| d9 | 18.27 | 7.26 | 1.80 |
| d24 | 0.80 | 3.83 | 11.12 |
| d30 | 14.16 | 25.46 | 32.52 |

ZOOM LENS UNIT DATA

| UNIT | START SURFACE | FOCAL LENGTH |
|---|---|---|
| 1 | 1 | 112.06 |
| 2 | 3 | −21.19 |
| 3 | 10 | 23.85 |
| 4 | 25 | 98.85 |

Numerical Example 5

| UNIT: mm | | | | |
|---|---|---|---|---|
| SURFACE DATA | | | | |
| SURFACE NUMBER | r | d | nd | vd |
| 1 | 33.906 | 4.05 | 1.59282 | 68.6 |
| 2 | 178.294 | (Variable) | | |
| 3 | 68.640 | 0.80 | 2.05090 | 26.9 |
| 4 | 11.645 | 5.22 | | |
| 5 | −30.797 | 0.70 | 1.49700 | 81.5 |

-continued

| UNIT: mm | | | | |
|---|---|---|---|---|
| 6 | 19.833 | 0.79 | | |
| 7 | 19.686 | 2.89 | 1.92286 | 20.9 |
| 8 | 143.641 | (Variable) | | |
| 9 | 23.677 | 1.61 | 2.05090 | 26.9 |
| 10 | −230.793 | 1.89 | | |
| 11 | 19.523 | 2.47 | 1.61800 | 63.3 |
| 12 | −19.345 | 0.50 | 2.00069 | 25.5 |
| 13 | 25.424 | 2.23 | | |
| 14(Diaphragm) | ∞ | (Variable) | | |
| 15 | 15.087 | 0.50 | 1.83481 | 42.7 |
| 16 | 7.584 | 4.64 | 1.61881 | 63.9 |
| 17* | −16.097 | (Variable) | | |
| 18 | −110.079 | 0.50 | 1.61340 | 44.3 |
| 19 | 14.834 | (Variable) | | |
| 20* | −54.976 | 1.50 | 1.53110 | 55.9 |
| 21* | −2568.724 | (Variable) | | |
| 22 | 45.139 | 2.32 | 1.96300 | 24.1 |
| 23 | 176.222 | (Variable) | | |
| Image Plane | ∞ | | | |

ASPHERIC DATA

Seventeenth surface
K = 0.00000e+000 A 4 = 1.15592e−004 A 6 = −1.12329e−006 A 8 = 7.29338e−008
A10 = −3.97268e−009 A12 = 5.47289e−011
Twentieth surface
K = 0.00000e+000 A 4 = 5.14039e−005 A 6 = −2.27979e−006 A 8 = 6.14878e−008
A10 = −1.24789e−009 A12 = 1.03195e−011
Twenty-first surface
K = 0.00000e+000 A 4 = 1.46631e−005 A 6 = −1.60734e−006 A 8 = 3.28650e−008
A10 = −5.34487e−010 A12 = 3.62883e−012

VARIOUS DATA
ZOOM RATIO 4.39

| | WIDE-ANGLE | MIDDLE | TELEPHOTO |
|---|---|---|---|
| FOCAL LENGTH | 15.45 | 37.46 | 67.90 |
| Fno | 3.93 | 5.64 | 7.31 |
| HALF VIEW ANGLE | 42.40 | 20.02 | 11.37 |
| IMAGE HEIGHT | 12.56 | 13.65 | 13.65 |
| OVERALL LENS LENGTH | 71.26 | 88.06 | 113.36 |
| BF | 12.40 | 22.39 | 24.51 |
| d2 | 0.44 | 13.26 | 23.04 |
| d8 | 14.34 | 4.04 | 0.80 |
| d14 | 3.19 | 1.31 | 1.14 |
| d17 | 2.50 | 1.86 | 1.39 |
| d19 | 4.98 | 7.50 | 8.14 |
| d21 | 0.80 | 5.11 | 21.73 |
| d23 | 12.40 | 22.39 | 24.51 |

ZOOM LENS UNIT DATA

| UNIT | START SURFACE | FOCAL LENGTH |
|---|---|---|
| 1 | 1 | 69.89 |
| 2 | 3 | −14.07 |
| 3 | 9 | 30.97 |
| 4 | 15 | 16.09 |
| 5 | 18 | −21.28 |
| 6 | 20 | −105.80 |
| 7 | 22 | 62.47 |

TABLE 1

| | Conditional Expressions | NE1 | NE2 | NE3 | NE4 | NE5 |
|---|---|---|---|---|---|---|
| (1) | 15.0 < vdLP < 30.0 | 20.88 | 20.88 | 23.78 | 23.78 | 24.11 |
| (2) | 0.50 < fLP/ft < 2.00 | 1.18 | 0.64 | 0.73 | 1.20 | 0.92 |
| (3) | 0.80 < f1/ft < 2.00 | 1.74 | 1.00 | 1.11 | 1.36 | 1.03 |
| (4) | −1.10 < f2/fw < −0.50 | −0.75 | −0.90 | −0.80 | −0.86 | −0.91 |
| (5) | 3.50 < TDw/fw < 5.00 | 4.11 | 4.41 | 4.35 | 4.11 | 4.61 |
| (6) | 0.30 < skw/fw < 1.00 | 0.51 | 0.57 | 0.55 | 0.57 | 0.80 |
| (7) | 0.05 < (dt − dw)/ft < 0.40 | 0.20 | 0.18 | 0.19 | 0.13 | 0.31 |
| (8) | −0.30 < mLP/ft < −0.05 | −0.18 | −0.14 | −0.22 | −0.22 | −0.18 |
| (9) | −0.40 < mL2/ft < 0.00 | −0.21 | −0.10 | −0.17 | −0.15 | −0.29 |
| (10) | 1.00 < mL1/mL3 < 2.00 | 1.52 | 1.30 | 1.22 | 1.43 | 1.27 |

Figure 16:
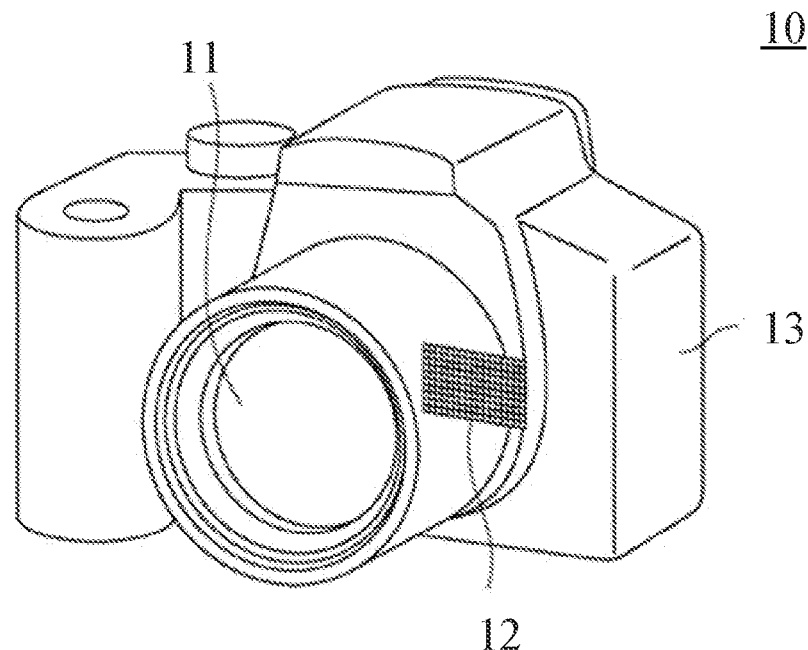
FIG. 16 is a schematic diagram of an imaging apparatus provided with a zoom lens according to each embodiment.

Referring now to FIG. 16, a description will be given of an embodiment of a digital still camera (imaging apparatus 10) by using the zoom lens (optical system) according to each embodiment for an imaging optical system. FIG. 16 is a schematic diagram of the imaging apparatus 10 including the zoom lens according to each embodiment.

In FIG. 16, reference numeral 13 denotes a camera body, and reference numeral 11 denotes an imaging optical system including any one of the zoom lenses according to the first to fifth embodiments. Reference numeral 12 denotes an image sensor (photoelectric conversion element) installed in the camera body 13, such as a CCD sensor and a CMOS sensor, which receives the optical image formed by the imaging optical system 11 and performs a photoelectric conversion. The camera body 13 may be a so-called single-lens reflex camera having a quick turn mirror or a so-called mirrorless camera having no quick turn mirror.

As described above, the zoom lens according to the present invention to the imaging apparatus 10 such as a digital still camera, can provide an imaging apparatus having high optical performance. The zoom lens according to each embodiment can be similarly applied to a video camera.

Each embodiment can provide a compact and lightweight zoom lens having a high optical performance over the entire zoom range, and an imaging apparatus having the same.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The above embodiment can provide a compact and lightweight zoom lens having a high optical performance over the entire zoom range, and an imaging apparatus having the same.

This application claims the benefit of Japanese Patent Application No. 2019-071892, filed on Apr. 4, 2019, which is hereby incorporated by reference herein in its entirety.

What is claimed is:

1. A zoom lens comprising in order from an object side to an image side:
   a first lens unit having a positive refractive power;
   a second lens unit having a negative refractive power; and
   a subsequent unit having a positive refractive power as a whole,
   wherein a distance between adjacent lens units changes during zooming,
   wherein the first lens unit consists of a single lens,
   wherein the subsequent unit includes a third lens unit having a positive refractive power closest to the object side in the subsequent unit and a lens unit LP having a positive refractive power closest to the image side among the zoom lens,
   wherein the lens unit LP is fixed during focusing,
   wherein during zooming from a wide-angle end to a telephoto end, the second lens unit moves toward the object side, and
   wherein the following conditional expressions are satisfied:

$$20.0 < vdLP < 30.0, \text{ and}$$

$$1.00 < mL1/mL3 < 2.00$$

where vdLP is an Abbe number of a material of a lens having the highest refractive power among the positive lenses included in the lens unit LP, mL1 is a moving amount of the first lens unit during zooming from the wide-angle end to the telephoto end, and mL3 is a moving amount of the third lens unit during zooming from the wide-angle end to the telephoto end.

2. The zoom lens according to claim 1, wherein the subsequent unit includes two or more lens units, in which the distance changes during zooming.

3. The zoom lens according to claim 1, wherein all lens units move to the object side during the zooming from the wide-angle end to the telephoto end.

4. The zoom lens according to claim 1, wherein the following conditional expression is satisfied:

$$0.50 < fLP/ft < 2.00$$

where ft is a focal length of the zoom lens at the telephoto end, and fLP is a focal length of the lens unit LP.

5. The zoom lens according to claim 1, wherein the following conditional expression is satisfied:

$$0.80 < f1/ft < 2.00$$

where ft is a focal length of the zoom lens at the telephoto end, and f1 is a focal length of the first lens unit.

6. The zoom lens according to claim 1, wherein the following conditional expression is satisfied:

$$-1.10 < f2/fw < -0.50$$

where f2 is a focal length of the second lens unit, and fw is a focal length of the zoom lens at the wide-angle end.

7. The zoom lens according to claim 1, wherein the following conditional expression is satisfied:

$$3.50 < TDw/fw < 5.00$$

where TDw is an overall lens length at the wide-angle end, and fw is a focal length of the zoom lens at the wide-angle end.

8. The zoom lens according to claim 1, wherein the following conditional expression is satisfied:

$$0.3 < skw/fw < 1.0$$

where skw is a backfocus of the zoom lens at the wide-angle end and fw is a focal length of the zoom lens at the wide-angle end.

9. The zoom lens according to claim 1, wherein the following conditional expression is satisfied:

$$0.05 < (dt - dw)/ft < 0.40$$

where ft is a focal length of the zoom lens at the telephoto end, dw is a distance between the lens unit LP and a lens unit adjacent to the lens unit LP on the object side of the lens unit LP at the wide-angle end, and dt is a distance between the lens unit LP and the lens unit adjacent to the lens unit LP on the object side of the lens unit LP at the telephoto end.

10. The zoom lens according to claim 1, wherein the following conditional expression is satisfied:

$$-0.30 < mLP/ft < -0.05$$

where mLP is a moving amount of the lens unit LP during zooming from the wide-angle end to the telephoto end, and ft is a focal length of the zoom lens at the telephoto end.

11. The zoom lens according to claim 1, wherein the following conditional expression is satisfied:

$$-0.40 < mL2/ft < -0.05$$

where mL2 is a moving amount of the second lens unit during zooming from the wide-angle end to the telephoto end, and ft is a focal length of the zoom lens at the telephoto end.

12. The zoom lens according to claim 1, further comprising a diaphragm disposed in the subsequent unit,
wherein the zoom lens provides focusing by moving one or more lenses included in the subsequent unit disposed on an image side of the diaphragm.

13. The zoom lens according to claim 1, wherein the following conditional expression is satisfied:

$$20.0 < vdLP < 25.0$$

14. The zoom lens according to claim 1, wherein the following conditional expression is satisfied:

$$20.88 \leq vdLP < 30.0$$

15. An imaging apparatus comprising:
a zoom lens in which a distance between adjacent lens units changes during zooming; and
an image sensor configured to receive an image formed by the zoom lens,
wherein the zoom lens includes, in order from an object side to an image side, a first lens unit having a positive refractive power, a second lens unit having a negative refractive power, and a subsequent unit having a positive refractive power as a whole,
wherein the first lens unit consists of a single lens,
wherein the subsequent unit includes a third lens unit having a positive refractive power closest to the object side in the subsequent unit and a lens unit LP having a positive refractive power closest to the image side among the zoom lens,
wherein the lens unit LP is fixed during focusing,
wherein during zooming from a wide-angle end to a telephoto end, the second lens unit moves toward the object side, and
wherein the following conditional expressions are satisfied:

$$20.0 < vdLP < 30.0, \text{ and}$$

$$1.00 < mL1/mL3 < 2.00$$

where vdLP is an Abbe number of a material of a lens having the highest refractive power among the positive lenses included in the lens unit LP, mL1 is a moving amount of the first lens unit during zooming from the wide-angle end to the telephoto end, and mL3 is a moving amount of the third lens unit during zooming from the wide-angle end to the telephoto end.

* * * * *